Patented Nov. 3, 1925.

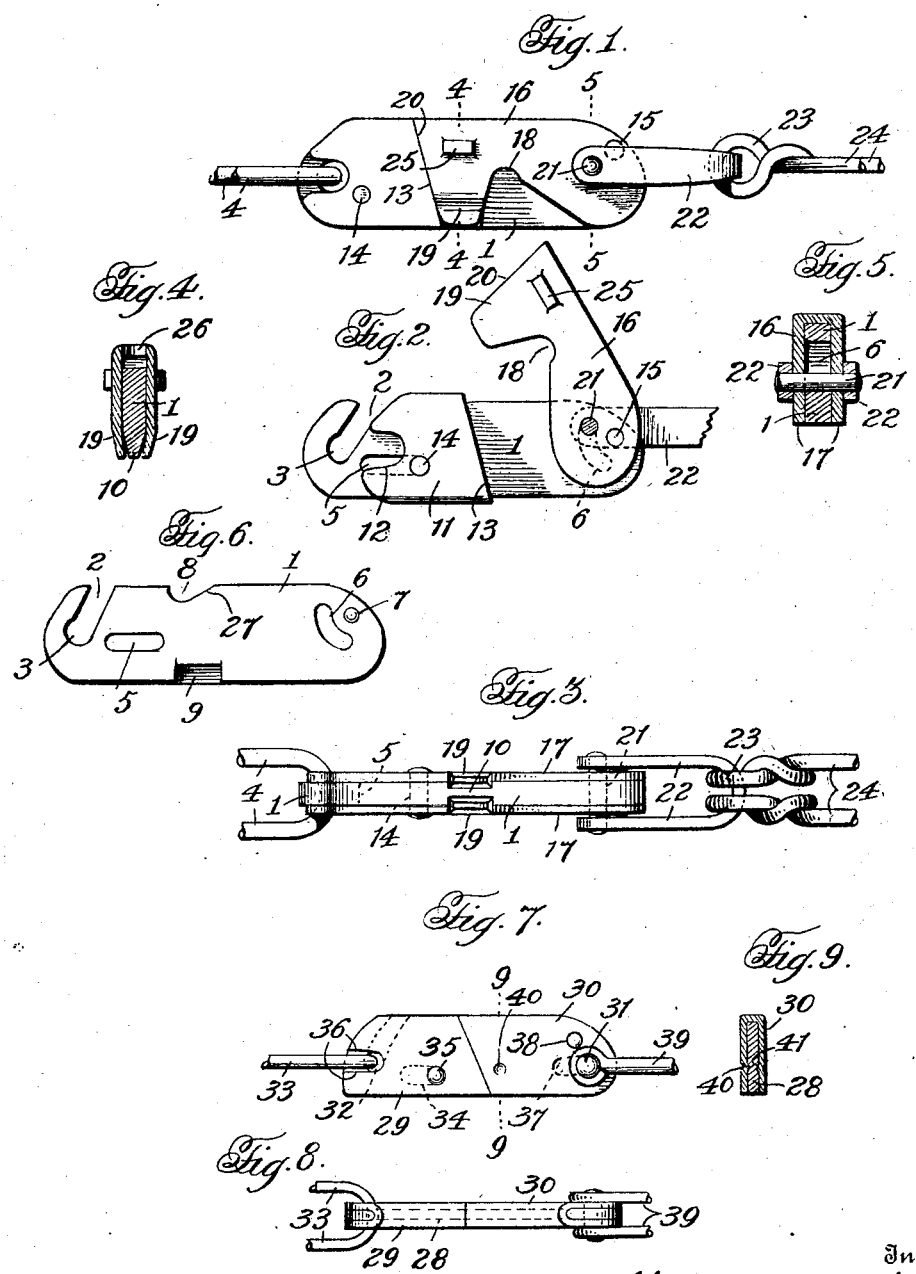

1,559,653

UNITED STATES PATENT OFFICE.

CHARLES A. STUCKER AND WILLIAM McCANDLESS, OF DAVENPORT, IOWA.

CHAIN LOCK.

Application filed July 28, 1923. Serial No. 654,372.

*To all whom it may concern:*

Be it known that we, CHARLES A. STUCKER and WILLIAM McCANDLESS, citizens of the United States, residing at Davenport, in the county of Scott and State of Iowa, have invented certain new and useful Improvements in Chain Locks, of which the following is a specification.

Our invention relates to new and useful improvements in a lock for chains and more particularly to a lock for connecting the ends of non-skid chains, used upon automobiles, or other chains, and has for its principal object the provision of a lock which when, in locked position, will be held against accidental displacement and will allow the wheel to be rotated in either direction without disconnecting the ends of the chain.

A further object of the invention resides in the construction of the lock in such a manner that it may be permanently connected to one end of the chain and detachably connected to the opposite end of the chain without undue labor and in its construction embodies a hook portion adapted to receive the end link, at that end where it is detachably connected, a slidable member adapted to close the slot forming the hook and engage the link, and a pivoted latch adapted to be swung into engagement with the end of the slidable member to hold it in its locking position against accidental displacement, the latch member being provided with means to hold it in its engaged position.

With the above and other objects in view, which will appear as the description proceeds, our invention consists in the novel details of construction, and arrangement of parts, described in the following specification and illustrated in the accompanying drawings, and while we have illustrated and described the preferred embodiments of the invention, as they now appear to us, it will be understood that such changes may be made as will fall within the scope of the appended claims.

In the drawings:

Fig. 1 is a side elevation showing the lock in its locking or engaging position.

Fig. 2 is a side elevation showing the lock in its unlocked position.

Fig. 3 is a bottom plan.

Fig. 4 is a transverse vertical section on the line 4—4 of Fig. 1.

Fig. 5 is a transverse vertical section on the line 5—5 of Fig. 1.

Fig. 6 is a side elevation of the body portion of the lock.

Fig. 7 is a side elevation showing a slightly modified form of lock in engaged position.

Fig. 8 is a top plan of that form of lock disclosed in Fig. 7, and

Fig. 9 is a transverse vertical section on the line 9—9 of Fig. 7.

It is the practice, when the ground is wet from rain, covered with snow, or muddy, to apply chains to wheels of automobiles, which have become known as non-skid chains, and when the chains are applied around the wheel it is necessary to connect the ends thereof to hold them in proper position upon the wheel and while various forms of locks have been provided for connecting the chain ends nevertheless many of them have allowed the ends of the chain to become disconnected and the chains to be lost in travel. With our form of lock we have guarded against accidental disconnecting and have provided a lock which will securely connect the ends of the chain and will hold the chain securely upon the wheel no matter in which direction the wheel is rotated. At the same time we have provided a lock which is simple and inexpensive in construction and which may be easily connected or disconnected to the chain and without undue labor on the part of the operator.

In the drawings 1 indicates the body portion of our lock which is of the elongated shape shown and is provided adjacent one end with the slot 2 which extends inwardly, at an angle, from one edge to form a hook portion on one end of the body. The slot 2 terminates, at its inner end, in the enlargement 3 which is adapted to receive one end of a link 4, forming part of a chain, the link, as will be understood, being inserted through the open end of the slot. A longitudinally extending elongated opening 5 is formed in the body, adjacent the slot, and formed adjacent the opposite end of the body is the arcuate-shaped opening 6 and the perforation 7, the perforation 7, as shown, being adjacent one longitudinal edge of the body and between the end of the body and the arcuate-shaped opening 6. Formed in that longitudinal edge, from which the slot 2 extends, is the notch 8 and formed on each face of the body at the opposite longitudinal edge is the cut-out portion 9, each of said cut-out portions being beveled inwardly from the face of the body towards the longitudinal edge so as to provide the reduced portion 10 more clearly illustrated in Figs. 3, 4 and 6 of the drawings.

Mounted upon the body 1 is the U-shaped slide 11, the bottom of this slide extending beneath the lower longitudinal edge of the body and the sides thereof extending parallel with the body and terminating at the upper edge of the body. The forward edge of the slide is provided with the notch or recess 12, it being understood that there is a notch or recess in each of the side plates of the slide, and the rear edge of the slide is upwardly and outwardly inclined as shown at 13. The forward edge of the slide is curved, as shown, so as to conform to the curvature of the end of the body, when the slide is in locked position, as more clearly illustrated in Fig. 1 of the drawings. A transversely extending pin 14 is carried by the slide and extends through the elongated opening 5 in the body, this pin 14 engaging the ends of the slot to limit the movement of the slide in opposite directions.

Pivotally connected to the body 1, at 15, is the latch 16, said latch being of substantially U-shape to provide the side faces 17 which engage on opposite faces of the body as more clearly illustrated in Figs. 3 and 4 of the drawings. Each of the side plates 17 is provided in its lower edge with a notch 18 which forms the projections 19 on the upper edge of the latch, at the free end thereof, and the projections 19 are bent inwardly as shown more particularly in Figs. 3 and 4 of the drawings so that when the latch is in its locked position said projections 19 will be received in the cut-out portions 9 of the body. The forward edge of the latch is downwardly and inwardly inclined as shown at 20 so that as the latch is swung into locking position the edge 20 will engage the edge 13 of the slide 11 and force the slide towards the end of the body and hold it in that position. A transversely extending pin 21 is carried by the latch, adjacent the pivoted end thereof, and extends through the arcuate-shaped opening 6 in the body, this pin 21, engaging the ends of the slot 6 to limit the movement of the latch in its upward movement. A bail 22 is secured to the pin 21 and is adapted to receive the eye 23 of the link 24 which forms one end of the chain. Formed on each side face 17 of the latch 16 is a projection 25 which is adapted to be engaged by the operator for moving the latch. An opening 26 is formed in the top of the latch 16 and the longitudinal edge of the body 1, adjacent the notch or recess 8 is beveled as shown at 27.

From the above detail description of the preferred form of our invention it is thought that the construction and operation will be clearly understood. The lock is permanently connected to the end link 24 by means of the bail 22. When the opposite end of the link 4 is to be connected the latch 16 is swung into the position shown in Fig. 2 and the slide is moved upon the body as also shown in this figure so as to leave the end of the slot 2 open. The link 4 is passed into the slot 2 and is received in the enlargement 3 thereof. With the link 4 in the position as described the slide 11 is moved towards the end of the body so that the notch 12 will be received around the end of the link, as shown more particularly in Fig. 1 of the drawings, and the top of the slide will close the end of the slot to prevent the removal of the link. The latch 16 is then swung downwardly, the projections 19 engaging the beveled portion 27 and riding over the faces of the body so that the beveled end 20 of the latch will engage the beveled end 13 of the slide and securely hold the slide against rearward movement upon the body. When the latch has been swung into its downward position the ends of the projections 19 will snap into the cut-out portions 9 of the body and there will be sufficient friction to hold the latch against accidental displacement. When it is desired to remove the link 4 from the slot the operation is reversed and the latch may be swung upwardly by engaging the projections 25 and pulling thereon. The pin 14, carried by the slide 11, engaging the ends of the slot 5 will limit the movement of the slide in opposite directions and the pin 21, carried by the latch 16, operating in the slot 6 will limit the upward swinging movement of the latch, the pin riding in the slot when the latch is swung upwardly.

In Figs. 7, 8 and 9 of the drawings we have illustrated a slightly modified form of our invention wherein 28 indicates the body of the lock, 29 the slide, and 30 the latch pivoted to the body at 31. The body has the slot 32, adjacent one end, extending from one longitudinal edge and the link 33 is adapted to be passed through this slot in the same manner as is the link 4 previously described. The body is also provided with the elongated opening 34 in which operates the transversely extending pin 35 carried by the slide and the notches 36 are formed in the outer end of the slide to engage around the link as is more clearly illustrated in Fig. 7 of the drawings. An arcuate-shaped slot 37 is formed in the body 28 adjacent the opposite end thereof and in this slot operates a transversely extending pin 38 which is carried by the latch and to which the link 39, forming one end of the chain, is attached, it being understood that the link 33 forms the opposite end of the chain. Inwardly extending projections 40 are struck from the sides of the latch and are adapted, when the latch is swung into locking position to engage in recesses 41 formed in the sides of the body.

The operation of securing the ends of the chain is the same as that described for the other form of our invention and in reality the only difference is in the manner of holding or securing the latch in locked position and the position of the elongated opening in the body, adjacent the end where the latch is pivoted, it being noted that in the preferred form of the invention the opening 6 is substantially vertical whereas the opening 37, in the modified form of the invention, is substantially horizontal. In the modified form of the invention the projections 40, formed in the latch, engaging in the recesses 41, formed in the body, takes the place of the projections 19 engaging in the cut-out portions 9 of the preferred form.

From the detail description above set forth of the two forms of our invention it will be seen that we have provided a novel form of lock which is simple and inexpensive in construction but which will securely connect the ends of a chain against accidental displacement. The lock may be easily manipulated and when used in connection with a non-skid chain for automobile wheels will allow the wheel to be rotated in either direction without disconnecting the chain. In thus securing the ends of the non-skid chain the loss of the chain is prevented and the chain is held securely upon the wheel. It will be seen that the lock is so constructed that the harder one pulls on either end of the chain, when the device is in locked position, the tighter it holds.

Having fully described our invention what we claim as new and desire to secure by Letters Patent is:

1. A lock of the character described for connecting the ends of a chain comprising a body having a slot therein to receive one end of the chain, a slide carried by the body and adapted when in one position to close the slot and when in another position to open the slot, and a latch connected to the body and adapted when in one position to engage the slide for holding it in position to close the slot and when in another position to allow free movement of the slide upon the body, the opposite end of the chain being connected to the latch.

2. A lock of the character described comprising a body having a slot therein, a slide carried by the body and movable relative thereto for opening or closing the slot, and a member connected to the body for swinging movement, said member adapted to frictionally engage the body and engage the slide for holding the same in its slot closing position but to be disengaged from the slide for allowing movement thereof to open the slot.

3. A lock of the character described comprising a body having a slot therein, a slide carried by the body and movable relative thereto for opening or closing the slot, and a member connected to the body for swinging movement, said member adapted to frictionally engage the body and engage the end of the slide for holding the same in its slot closing position but to be disengaged from the end of the slide for allowing movement thereof to open the slot.

4. A lock of the character described comprising a body having a slot therein, a slide mounted upon the body and adapted to be moved thereon to open or close the slot, the inner end of said slide being cut at an angle, and a member connected to the body and adapted to be engaged with or disengaged from the angle end of the slide for holding the slide in its slot closing position or to allow the same to be moved into position to open the slot.

5. A lock of the character described comprising a body having a slot formed therein to receive a link, a slide carried by the body and adapted to be moved relative thereto for closing or opening the slot, said slide having a notch therein to receive the link within the slot, and means engageable with the slide for holding the same in its slot closing position but disengageable from the slide to allow movement thereof to open the slot.

6. A lock of the character described comprising a body having a slot therein, a slide carried by the body and movable relative thereto for opening or closing the slot, said slide having portions overlying the sides of the body, means carried by the overlying portions of the slide and extending through an opening in the body for limiting the movement of the slide, and a member connected to the body for swinging movement, said member adapted to engage the slide for holding the same in its slot closing position but to be disengaged from the slide for allowing movement thereof to open the slot.

7. A lock of the character described comprising a body having a slot therein, a slide carried by the body and movable relative thereto for opening or closing the slot, said slide having portions overlying the sides of the body, means carried by the overlying portions of the slide and extending through an opening in the body for limiting the movement of the slide, a member connected to the body for swinging movement, said member having portions adapted to overlie the body and engage the slide for holding the same in its slot closing position but to be disengaged from the slide for allowing movement thereof to open the slot, and means carried by the overlying portions of the swinging member and extending through an opening in the body for limiting the movement of the member.

8. A lock of the character described comprising a body having a slot therein, a slide mounted upon the body and adapted to be moved thereon to open or close the slot, the inner end of said slide being cut at an angle, and a member connected to the body for swinging movement, said member having its inner end cut at an angle and adapted to be engaged with or disengaged from the angle end of the slide for holding the slide in its slot closing position or to allow the same to be moved into position to open the slot.

9. A lock of the character described comprising a body having a slot therein, a slide carried by the body and movable relative thereto for opening or closing the slot, and a member connected to the body for swinging movement, said member having projections adapted to engage the body for holding the member in position relative to the body, and said member adapted to engage the slide for holding the same in its slot closing position but when disengaged therefrom allowing the slide to be moved to open the slot.

In testimony whereof we affix our signatures.

CHARLES A. STUCKER.
WILLIAM McCANDLESS.